(12) United States Patent
Ide et al.

(10) Patent No.: US 6,890,105 B2
(45) Date of Patent: May 10, 2005

(54) RADIAL BALL BEARING RETAINER

(75) Inventors: Fumihiko Ide, Miyota-Machi (JP); Takuya Yamamoto, Miyota-Machi (JP)

(73) Assignee: Minebea Company, Ltd., Miyota-Machi (JP)

( * ) Notice: Subject to any disclaimer, the term of this patent is extended or adjusted under 35 U.S.C. 154(b) by 98 days.

(21) Appl. No.: 10/417,975

(22) Filed: Apr. 17, 2003

(65) Prior Publication Data

US 2004/0001658 A1 Jan. 1, 2004

(30) Foreign Application Priority Data

Apr. 18, 2002 (JP) ........................................ 2002-115901

(51) Int. Cl.$^7$ ............................ F16C 33/66; F16C 33/49
(52) U.S. Cl. ...................................... 384/470; 384/531
(58) Field of Search ................................ 384/470, 523, 384/531

(56) References Cited

U.S. PATENT DOCUMENTS

| | | | |
|---|---|---|---|
| 4,133,588 A | | 1/1979 | Earsley |
| 4,225,199 A | * | 9/1980 | Earsley ........................ 384/470 |
| 4,226,484 A | * | 10/1980 | Glassow et al. ............ 384/470 |
| 5,806,990 A | * | 9/1998 | Ueno et al. .................. 384/530 |
| 6,074,099 A | | 6/2000 | Mutou et al. |
| 6,276,836 B1 | * | 8/2001 | Suzuki et al. ................ 384/531 |
| 6,371,655 B1 | | 4/2002 | Fierling |

FOREIGN PATENT DOCUMENTS

| | | |
|---|---|---|
| DE | 21 19 917 A | 11/1972 |
| EP | 0 668 449 A2 | 8/1995 |
| JP | 2000-039024 | 8/2000 |

OTHER PUBLICATIONS

Communiation—European Search Report dated Aug. 8, 2003, 3 pgs.

* cited by examiner

*Primary Examiner*—Thomas R. Hannon
(74) *Attorney, Agent, or Firm*—Schulte Roth & Zabel LLP; Joel E. Lutzker; Mayankkumar Dixit (57) ABSTRACT

A deep channel type of radial ball bearing having a retainer. The bearing has an outer ring and an inner ring. Running channels are formed on the mutually opposing orbiting surfaces of the outer ring and inner ring. A specified number of balls are fit into the running channels. The retainer having pockets is placed between the outer ring and the inner ring. Each ball is captured in one of the pockets. A ball contact surface is formed on the inner surface of each edge on the opening side of the pockets. A curved ridge line forms the boundary between the inner surface of the pocket and the contact surface. This curved ridge line that forms the boundary is substantially parallel to the direction of rotation of the balls. A channel is formed at the bottom surface of the pocket. The channel extends from the inner perimeter to the outer perimeter of the retainer. The lubricating oil on the bottom surface of the pocket flows through the channel by virtue of the rolling of the balls and is guided to the outer perimeter side. A triangle-shaped fin having an inclined surface is integrally formed between the adjacent pockets on the outer perimeter surface. The inclined surface is formed on the trailing side of pocket with respect to the retainer direction of rotation. Lubricating oil directed from the above-described channel to the outer perimeter surface by the rolling of the ball is received at the inclined surface of the fin and is supplied to the vicinity of the leading edge of the pocket that is located behind the fin by the rotation of the retainer.

16 Claims, 7 Drawing Sheets

RADIAL BALL BEARING RETAINER

CROSS REFERENCE TO RELATED APPLICATION

This application claims priority from the commonly-assigned Japanese Patent Application Number JP 2002-115901 entitled "Radial Ball Bearing Retainer".

BACKGROUND OF THE INVENTION

1. Field of the Invention

The present disclosure relates to low rotational torque radial ball bearings. The bearings of the present invention may be used, for example, in a general purpose motor and motors used in equipment such as data equipment and audio equipment. In particular, the present disclosure relates to retainer for a radial ball bearing having at least one channel to facilitate flow of lubricating oil.

2. Description of the Related Art

Figure 10:
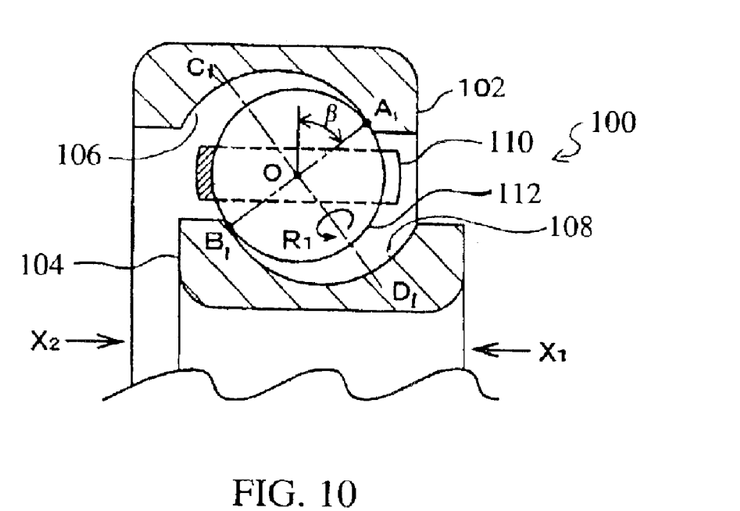
FIG. 10 is a cross-sectional view showing the operational state of a conventional radial ball bearing.

FIG. 10 shows a conventional radial ball bearing 100 having an outer ring 102 and an inner ring 104. Running channels (raceways) 106 and 108 are formed on outer ring 102 and inner ring 104 respectively. Running channel 106 is on the inner surface of outer ring 102. Running channel 108 is on the outer surface of inner ring 104. Running channels 106 and 108 are arc-shaped. A retainer 110 is located between inner ring 104 and outer ring 102. Balls 112 are supported in retainer 110 and are kept separate from each other with equal distance between any two adjacent balls 112. Retainer 110 rotates with the rotating ring of bearing 100. Balls 112 roll in running channels 106 and 108. The diameter of running channels 106 and 108 are greater than the diameter of balls 112. Thus, there is a radial gap between the surface of balls 112 and channels 106 and 108 except where balls 112 contact channels 106 and 108. A lubricant such as grease or lubricating oil is injected in bearing 100 to lower the sliding friction. The lubricant moves between running channels 106 and 108 due to the rotation of balls 112, thereby keeping the rolling surface of balls 112 lubricated.

In normal use, a preload in the axial direction is applied to radial ball bearing 100. The application of preload improves characteristics of radial ball bearing 100. For example, application of preload improves ball vibration control, rotational accuracy and rigidity. In FIG. 10 the axial preload is applied to inner ring 104 in $X_2$ direction i.e. from the left side of radial ball bearing 100. When the preload is applied, the presence of the radial gap causes outer ring 102 and inner ring 104 to become offset in the axial direction relative to one another. The offsetting of inner ring 104 from outer ring 102 causes balls 112 to contact outer ring 102 and inner ring 104 at points $A_1$ and $B_1$ respectively. The line joining points $A_1$ and $B_1$, forms contact angle $\beta$ with a vertical line passing through center of ball 112 as shown in FIG. 10, when inner ring 104 rotates clockwise when viewed from $X_1$ direction, balls 112 along with retainer 110 orbit around inner ring 104 and in same direction as the direction of rotation of inner ring 104. At the same time balls 112 also turn around axis $C_1 D_1$ in the direction of arrow $R_1$ as shown in FIG. 10. Line joining point $A_1$ and point $B_1$ is perpendicular to axis $C_1 D_1$ and they intersect at point $O_1$ which is the center of ball 112.

When the rotational axis $C_1 D_1$ of balls 112 is tilted with respect to the bearing axial direction due to the application of preload, lubricating oil which moves between running channel 106 and running channel 108 is subjected to shear force when it passes between the inner wall of retainer 110 and balls 112. In this case, retainer 110 impedes smooth movement of lubricating oil and increases the mixing resistance of lubricating oil. This leads to increased bearing rotational torque, which in turn can cause heating or rotational unevenness, which in turn increases power consumption of device that uses radial ball bearing 100.

Therefore, it is desirable to provide a radial ball bearing wherein the shear force on the lubricating oil is reduced. It is further desirable to provide a retainer for radial ball bearing with contact surfaces that form a line contact with the balls of the radial ball bearing. It is also desirable that the boundary between the contact surface and the retainer surface is substantially parallel to a line drawn through the center of the balls, the line being perpendicular to the axis of rotation of the balls.

SUMMARY OF THE INVENTION

The disclosed retainer overcomes the aforesaid shortcomings of the prior art when used in a radial ball bearing by improving the lubrication characteristics of the radial ball bearing, and thereby reducing the rotational torque. The lubrication characteristics of the radial ball bearing are improved due to prevention of the shearing of the lubricating oil.

Disclosed is a deep channel type of radial ball bearing (hereinafter referred to as "bearing") having a retainer. The bearing has an outer ring and an inner ring. Running channels are formed on the mutually opposing orbiting surfaces of the outer ring and inner ring. A specified number of balls are fit into the running channels. The retainer having pockets is placed between the outer ring and the inner ring. Each ball is captured in the pocket. The space between any two adjacent balls is the same. The balls are free to roll within the pocket. The running channels are arc-shaped, with a diameter somewhat larger than the diameter of the balls. The larger diameter of the running channels results in a radial gap between the surface of the running channels and the balls.

The pockets are C shaped and open on one side in the axial direction. Claws capable of elastic deformation are formed at the open ends of the C shaped pockets. Guide surfaces formed at the tip of the pair of claws ease the introduction of the balls into the pocket.

Figure 2:
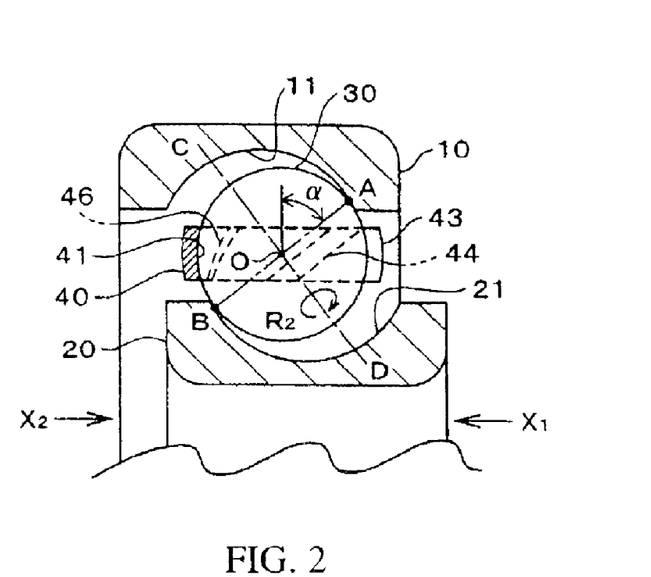
FIG. 2 is a detailed view of section E of FIG. 1.

When the bearing is in use, a preload is applied in the axial direction. Pockets of the retainer open in the opposite direction to the preload direction. The application of the preload, in presence of the radial gap causes the outer ring and the inner ring to be axially offset relative to one another, which results in, as shown in FIG. 2, each ball contacting the outer ring at point A and the inner ring at point B. Line AB connecting points A and B forms a contact angle a with a ball's vertical axis intersecting line AB at O, the center of a ball. When the outer ring rotates, balls orbit along with the retainer rotating in the same direction as the outer ring, while also rolling in the direction of the arrow $R_2$ around the axis CD, which is perpendicular to AB.

Grease or other lubricating oil is inserted into the bearing. The inserted lubricating oil moves between the outer ring and the inner ring due to the rotation of the balls in the pockets and is constantly supplied to the rolling surface of the balls.

A ball contact surface is formed on the inner surface of each end of the opening side of the pockets. These contact surfaces curve along the rolling direction of the balls. These contact surfaces have a specified width. The rolling ball makes a line contact with the contact surfaces and also contacts the bottom surface of the pocket. The balls roll while being supported at three places: the bottom surface of the pocket and the two contact surfaces. A curved ridge line forms the boundary between the inner surface of the pocket and the contact surface. This curved ridge line that forms the boundary is parallel to the line AB.

A channel is formed at the bottom surface of pocket. The channel extends from the inner perimeter to the outer perimeter of the retainer. The channel curves as well as gradually widens as it reaches the outer perimeter. The lubricating oil on the bottom surface of the pocket flows through the channel by virtue of the rolling of balls and is guided to the outer perimeter side.

A triangle-shaped fin is integrally formed between the adjacent pockets on the outer perimeter surface. A shallow curved surface (the lubricating oil flow path) is formed on the fin-inclined surface. The inclined surface is formed on the trailing side of each pocket with respect to the retainer direction of rotation. The inclined surface on the trailing surface of the pocket gradually widens as it advances toward the leading side of the adjacent pocket. Lubricating oil directed from the above-described channel to the outer perimeter surface by the rolling of the ball is received at the inclined surface of the fin and is supplied to the vicinity of the leading edge of the pocket, that is located behind the fin, by the rotation of the retainer.

The shape of the retainer in terms of the forming position and direction of the contact surfaces and the channel may differ depending on differences in ball rolling axis, direction of the opening in the pocket and direction of application of the preload.

Further features and advantages will appear more clearly on a reading of the detailed description, which is given below by way of example only and with reference to the accompanying drawings.

DETAILED DESCRIPTION

Figure 1:
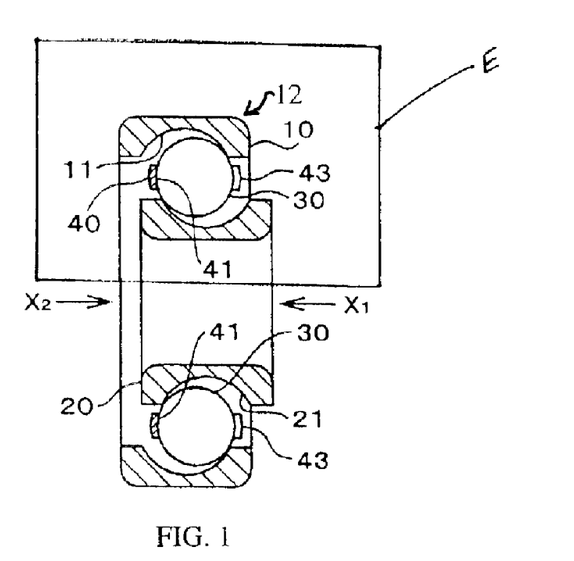
FIG. 1 is a cross-sectional view of a radial ball bearing with the retainer of the first embodiment.

FIG. 1 depicts a deep channel type radial ball bearing 12 (hereinafter referred to as "bearing") employing a retainer 40 of the first embodiment. Bearing 12 has an outer ring 10 and an inner ring 20. Running channels 11 and 21 are formed on the mutually opposing orbiting surfaces of outer ring 10 and inner ring 20, respectively. Thus, running channels 11 and 21 are on the inner perimeter surface of outer ring 10 and the outer perimeter surface of inner ring 20 respectively. A specified number of balls 30 are fit into running channels 11 and 21. Retainer 40 having pockets 41 is placed between outer ring 10 and inner ring 20. Each ball 30 is captured in pocket 41. The space between any two adjacent balls 30 is the same. Balls 30 are free to roll within their corresponding pockets 41. Running channels 11 and 21 are arc-shaped, with a diameter somewhat larger than the diameter of balls 30. The larger diameter of running channels 11 and 21 results in a radial gap between the surface of running channels 11 and 21 and balls 30.

Figure 3:
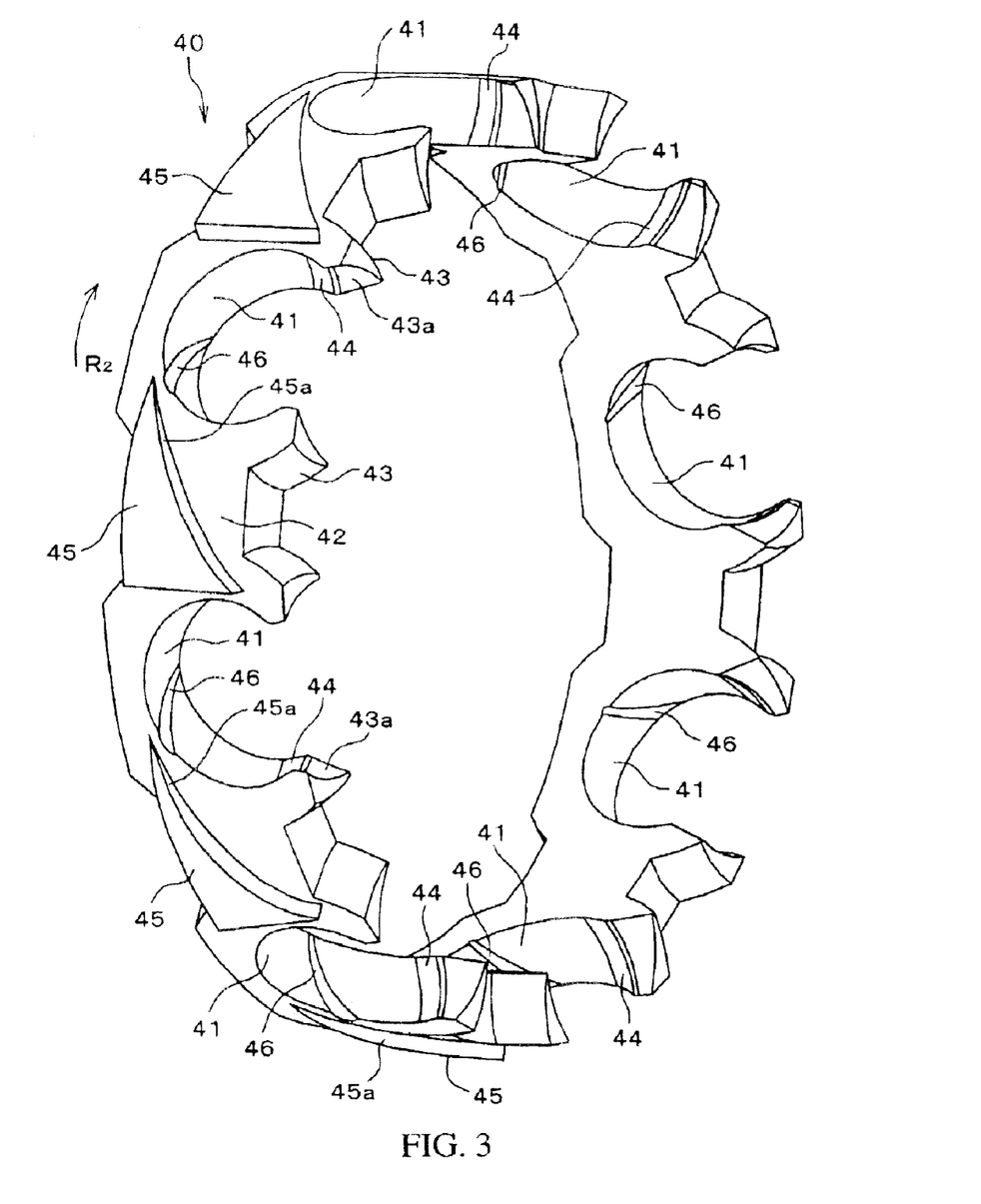
FIG. 3 is a perspective view of the retainer of the first embodiment.

Retainer 40 may be a crown type retainer and may be made of resin. FIG. 3 shows retainer 40 with multiple pockets 41 formed at equal spacing in the circumferential direction on a ring 42 that forms the main body of retainer 40. Pocket 41 is C-shaped and opens on one side in the axial direction. Claws 43 are formed at the open ends of C-shaped pockets 41 and are capable of elastic deformation. The inner surface of each pocket 41 is spherical and somewhat larger than the diameter of ball 30. Balls 30 are enclosed in pocket 41 and held in so as to be able to turn freely. The center of each ball 30 is positioned at approximately the center of the thickness of retainer 40. Guide surfaces 43a, formed at the tip of the pair of claws 43, ease the introduction of balls 30 into pocket 41. To assemble balls 30 in retainer 40, ball 30 is brought into contact with guide surfaces 43a on pair of claws 43 and pushed into the pocket, thereby parting claws 43 and introducing ball 30 in pocket 41.

As shown in FIGS. 1 and 2, in use, bearing 12 has a preload applied to it in the axial direction. In FIGS. 1 and 2, outer ring 10 is set as the rotating ring, and a preload is applied to outer ring 10 in the $X_1$ direction shown. When viewed from the $X_1$ direction, outer ring 10 rotates in a clockwise direction. Retainer 40 is mounted from the direction opposite to the preload direction (i.e. left side in FIG. 2). Pockets 41 of retainer 40 open in the opposite direction (i.e. right side in FIG. 2) to the preload direction. Alternatively, pockets 41 may open in the preload direction in another embodiment of retainer 40.

The application of the preload, in presence of the radial gap causes outer ring 10 and inner ring 20 to be axially offset relative to one another, which results in, as shown in FIG. 2, each ball 30 contacting outer ring 10 at point A and inner ring 20 at point B. Line AB connecting points A and B forms a contact angle a with a ball's vertical axis intersecting line AB at O, the center of balls 30. When outer ring 10 rotates, balls 30 orbit along with retainer 40 that rotates in the same direction as outer ring 10. Balls 30 also roll in the direction of the arrow $R_2$ around the axis CD that is perpendicular to AB.

Grease or other lubricating oil is injected into bearing 12 and, if necessary, a ring shaped seal (not shown) is mounted on the inner perimeter surface of outer ring 10. The inserted lubricating oil moves between running channels 11 and 21, due to the rotation of balls 30 in pockets 41 in retainer 40, and is constantly supplied to the rolling surface of balls 30.

Figure 4:
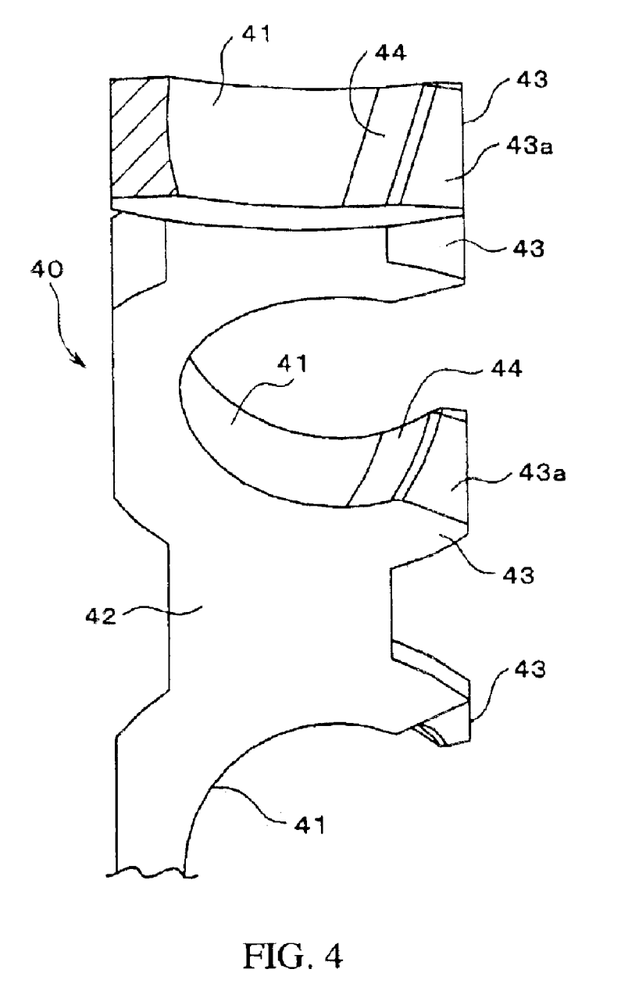
FIG. 4 is a perspective view showing the inner surface of the pocket of the retainer of the first embodiment.
Figure 5:
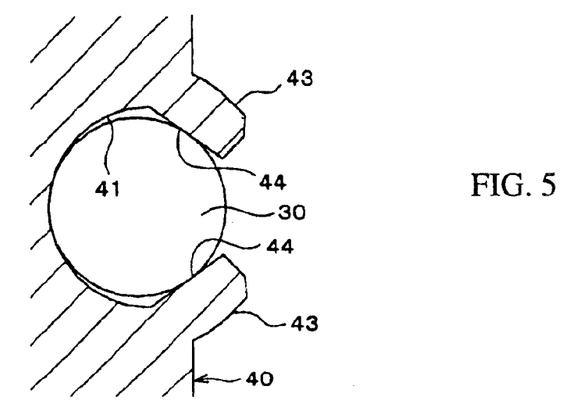
FIG. 5 is a cross-sectional view showing a ball held in place in the pocket of the retainer of the first embodiment.

A ball contact surface 44 is formed on the inner surface of each end of the opening side of pockets 41 in retainer 40, as shown in FIGS. 2–4. These contact surfaces 44 curve along the rolling direction of balls 30 in such manner that when a preload is applied to outer ring 10 a contact angle a is produced. Contact surfaces 44 are conical compound curved surface. The inner surface of pockets 41 forms a spherical compound curved surface. These contact surfaces 44 have a specified width as shown in FIG. 5. Rolling ball 30 makes a line contact with contact surfaces 44, and also contacts the bottom surface of pocket 41. The line contact may be in a direction substantially parallel to the line AB, which connects the contact points A and B. Balls 30 roll while being supported at three places: bottom surface of pocket 41 and two contact surfaces 44. Because contact surfaces 44 curve along ball 30 rolling surface, each contact surface 44 tilts with respect to the thickness direction of retainer 40. A curved ridge line forms the boundary between the inner surface of spherical pocket 41 and the contact surface 44. This curved ridge line that forms the boundary is parallel to the line AB as shown in FIG. 2.

Figure 6:
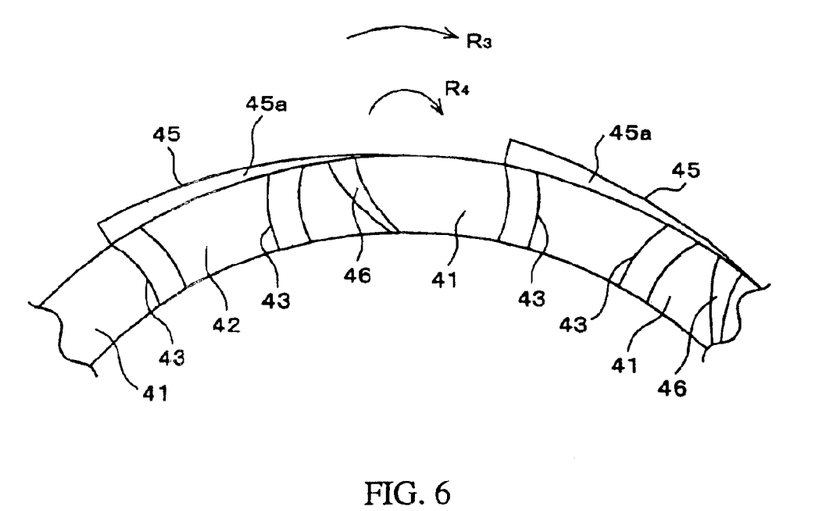
FIG. 6 is a side view of the retainer of the first embodiment.

FIG. 6 shows retainer 40. When outer ring 10, which is the rotating ring, rotates in the $R_3$ direction, which is clockwise when viewed from the $X_1$ direction in FIGS. 1 and 2, retainer 40 of FIG. 6 also rotates in this direction. Balls 30 roll in the $R_4$ direction when outer ring 10 rotates in $R_3$ direction. A channel 46 is formed at the bottom surface of pocket 41. Channel 46 extends from the inner perimeter to the outer perimeter of retainer 40. Channel 46 curves as well as gradually widens as it reaches the outer perimeter. The lubricating oil on the bottom surface of pocket 41 flows through channel 46 by virtue of rolling of the balls 30, and is guided to the outer perimeter side.

As shown in FIGS. 3 and 6, a triangle-shaped fin 45 is integrally formed between adjacent pockets 41, on the outer perimeter surface of retainer 40. A shallow curved surface (the lubricating oil flow path) is formed on fin 45 inclined surface 45a. Inclined surface 45a is formed on the trailing side of pocket 41 with respect to retainer's 40 direction of rotation $R_3$ (this is the same as the direction of rotation of the outer ring 10). Inclined surface 45a on the trailing surface of pocket 41 gradually widens as it advances toward the leading side of the adjacent pocket 41. Lubricating oil directed from the above-described channel 46 to the outer perimeter surface by the rolling of ball 30 is received at inclined surface 45a of fin 45, and is supplied to the vicinity of the leading edge of pocket 41 that is located behind fin 45 by the rotation of retainer 40.

When above described retainer 40 of the first embodiment is used, the lubricating oil which moves between outer ring 10 and inner ring 20 by virtue of rolling of the balls, moves smoothly due to the fact that contact surface 44 curves along the rolling direction of balls 30 thereby reducing the shearing of the lubricating oil. In other words, shearing force with respect to the lubricating oil is reduced resulting in reduction in rotation torque and improvement in bearing life.

Also, because the lubricating oil at the bottom surface of channel 46 flows in the direction in which balls 30 roll, shearing of the lubricating oil is reduced and lubricating characteristics are improved.

The lubricating oil, which is directed to the outer perimeter surface from channel 46, is received at fin's 45 inclined surface 45a and by virtue of the rotation of the retainer 40 it flows over the inclined surface 45a toward the trailing side of the direction of rotation. This lubricating oil is supplied to the vicinity of the adjacent pocket's 41 opening. In other words, the action of supplying lubricating oil from pocket 41 bottom surface to the vicinity of the opening of pocket 41 adjacent thereto is successively relayed and repeated. It is easy to store lubricating oil on pocket's 41 bottom surface, and on the other hand it is difficult for lubricating oil to be supplied to the inner surface on the opening side. Therefore, adoption of this form enables the lubricating oil to thoroughly cover pocket's 41 inner surface, and allows for an improvement in lubricating characteristics.

The shape of retainer 40 in terms of the forming position and direction of the contact surfaces 44 and channel 46 differs depending on differences in the rolling axis of ball 30, direction of the opening in pocket 41 and direction of application of the preload.

Channel 46, formed on the inner surface of pocket 41, and fin 45 combination is preferably applied to bearings of the type for which outer ring 10 is the rotating ring, and outer ring 10 rotates in a clockwise direction (the $R_3$ direction in FIG. 6) when viewed from the $X_1$ direction in FIGS. 1 and 2. Described hereafter are the differences in the preferred form of channel 46 and fin 45 for the case in which outer ring 10 rotates in the counterclockwise direction as seen from the direction $X_1$ and the outer ring 10 and inner ring 20 are offset in the axial direction as shown in FIGS. 1 and 2 (second embodiment). Also described hereafter are the differences in the form for the cases in which inner ring 20 is the rotating ring, and the direction of rotation thereof is counterclockwise (third embodiment) and clockwise (fourth embodiment).

Figure 7:
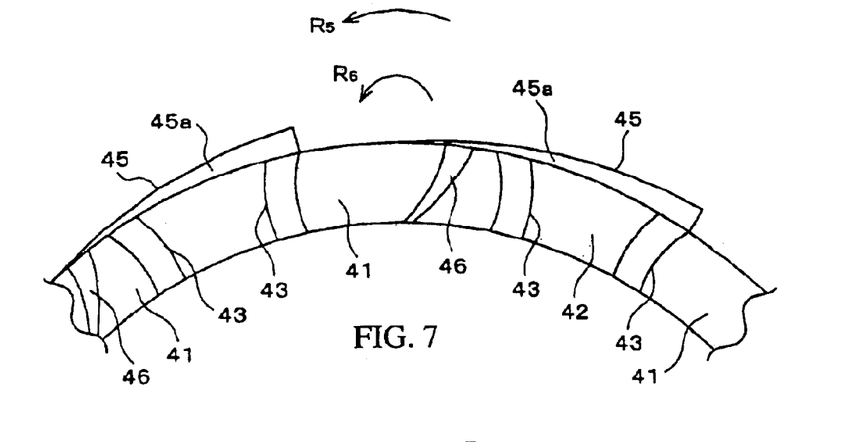
FIG. 7 is a side view of the retainer of the second embodiment.

FIG. 7 shows the second embodiment of retainer 40 preferably for use when, as seen from the $X_1$ direction, outer ring 10 rotates counterclockwise ($R_5$ direction) and outer ring 10 and inner ring 20 are axially offset, as shown in FIGS. 1 and 2. Balls 30 rolling direction in this case is the R6 direction. Channel 46 is formed in the rolling direction of balls 30 on the inner surface of pocket 41. The lubricating oil flows in this channel 46 and is directed to the outer perimeter surface. Inclined surface 45a of fin 45 receives the lubricating oil and directs it to the vicinity of the pocket's 41 opening on the trailing side of retainer's direction of rotation.

Figure 8:
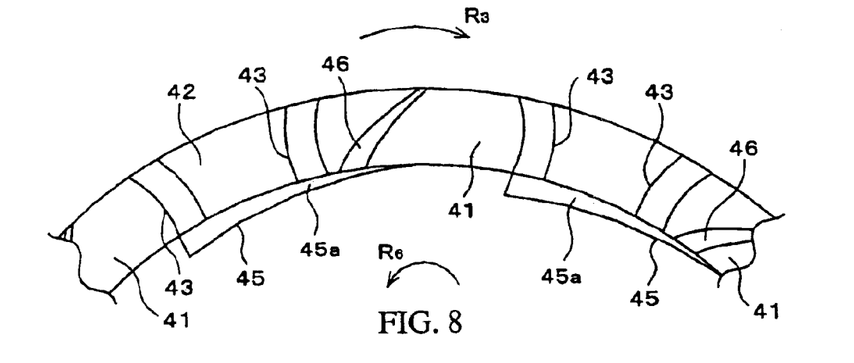
FIG. 8 is a side view of the retainer of the third embodiment.

FIG. 8 shows the third embodiment of retainer 40 preferably used when the inner ring 20 rotates in a clockwise direction (R3 direction) as seen from the direction of $X_1$ in FIGS. 1 and 2. In this case, the preload is applied to inner ring 20 in the $X_2$ direction as shown in FIGS. 1 and 2. Balls 30 roll in the $R_6$ direction. Channel 46 is formed in pocket's 41 inner surface in the rolling direction, and lubricating oil flows in channel 46 and is directed to the inner perimeter surface. Inclined surface 45a of fin 45 receives the lubricating oil from channel 46 and directs it to the vicinity of the opening of pocket 41 on the trailing side of the retainer's direction of rotation.

Figure 9:
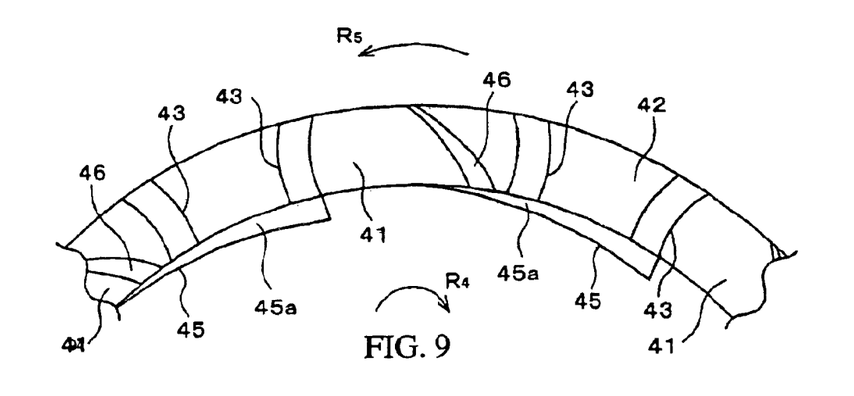
FIG. 9 is a side view of the retainer of the fourth embodiment.

FIG. 9 shows the fourth embodiment of retainer 40 preferably used when the inner ring 20 rotates counterclockwise (in the $R_5$ direction) as seen from the direction of $X_1$ in FIGS. 1 and 2. In this case, balls 30 rolling direction is the $R_4$ direction. Channel 46 is formed in pocket's 41 inner surface in the rolling direction, and lubricating oil flows through channel 46 and is directed to the inner perimeter surface. Inclined surface 45a of fin 45 receives the lubricating oil from channel 46 and directs it to the vicinity of the opening of pocket 41 on the trailing side of the retainer's direction of rotation.

While a preferred embodiment of the invention has been described, various modifications will be apparent to one skilled in the art in light of this disclosure and are intended to fall within the scope of the appended claims.

We claim:

1. A radial ball bearing comprising:

an outer ring;

an inner ring placed within the outer ring;

a retainer mounted between the inner ring and the outer ring;

a plurality of pockets formed in the retainer, the pockets having a spherical inner surface;

a ball placed in each of the pockets, the ball being free to rotate in the pocket;

at least one contact surface formed in each of the pockets, the boundary between the contact surface and the spherical inner surface being parallel to a contact angle formed upon application of a preload to one of the inner rings and the outer ring.

2. The radial ball bearing of claim 1, wherein each of the pockets is open on one side.

3. The radial ball bearing of claim 1, wherein each of the pockets is "C" shaped.

4. The radial ball bearing of claim 3, wherein each of the pockets further comprises:

two free ends; and claws formed at each free end, the claws forming a guide surface to guide the balls in the pocket.

5. The radial ball bearing of claim 1, further comprising:

at least one channel formed on the spherical inner surface, the channel connecting a retainer's outer perimeter surface to a retainer's inner perimeter surface.

6. The radial ball bearing of claim 5, wherein the channel is substantially aligned with the direction of rotation of the balls.

7. The radial ball bearing of claim 6, wherein the channel comprises a first end and a second end and wherein the channel gradually widens from the first end to the second end.

8. The radial ball bearing of claim 5, wherein lubricating oil moves from one perimeter surface to another perimeter surface due to the rotation of the balls.

9. The radial ball bearing of claim 5 wherein the plurality of pockets further comprises:

a first pocket and a second pocket being adjacent to the first pocket on a trailing side of the first pocket and wherein the radial ball bearing further comprises a lubricating oil flow path directing the lubricating oil to the second pocket.

10. The radial ball bearing of claim 1, wherein the retainer is made from a resin.

11. A radial ball bearing retainer comprising:

a retainer body placed into a radial ball bearing;

a plurality of pockets formed in the retainer body, the pockets having a spherical inner surface;

a ball placed in each of the pockets, the ball being free to rotate in the pocket;

at least one contact surface formed in each of the pockets, the boundary between the contact surface and the spherical inner surface being parallel to a contact angle formed upon application of a preload to the radial ball bearing.

12. The radial ball bearing retainer of claim 11, further comprising:

at least one channel formed on the spherical inner surface, the channel connecting a retainer's outer perimeter surface to a retainer's inner perimeter surface.

13. The radial ball bearing retainer of claim 12, wherein the channel is substantially aligned with the direction of rotation of the balls.

14. The radial ball bearing retainer of claim 13, wherein the channel comprises a first end and a second end and wherein the channel gradually widens from the first end to the second end.

15. The radial ball bearing retainer of claim 12, wherein lubricating oil moves from one perimeter surface to another perimeter surface due to the rotation of the balls.

16. The radial ball bearing retainer of claim 12, wherein the plurality of pockets further comprises:

a first pocket and a second pocket being adjacent to the first pocket on a trailing side of the first pocket and wherein the retainer further comprises:

a lubricating oil flow path directing lubricating oil to the second pocket.

* * * * *